United States Patent Office 3,514,264
Patented May 26, 1970

3,514,264
APPARATUS FOR ELECTRIC ARC-CRACKING OF HYDROCARBONS
Kurt Sennewald, Knapsack, near Cologne, Ludwig Bender, Bruhl, near Cologne, Klaus Gehrmann, Knapsack, near Cologne, Erich Schallus, Cologne, Hans-Werner Stephan, Cologne-Klettenberg, and Lothar Strie, Knapsack, near Cologne, Germany, assignors to Knapsack Aktiengesellschaft, Knapsack, near Cologne, Germany
Original application Aug. 2, 1965, Ser. No. 476,422, now Patent No. 3,409,695, dated Nov. 5, 1968. Divided and this application Aug. 3, 1967, Ser. No. 658,259.
Claims priority, application Germany, Aug. 5, 1964, K 53,671
Int. Cl. H05b 7/18; C07c 11/24
U.S. Cl. 23—284                       7 Claims

ABSTRACT OF THE DISCLOSURE

Alternatively, apparatus comprises in coaxial arrangement a conventional arc chamber, an axially symmetrical preliminary reaction chamber with the larger diameter thereof facing the arc chamber and with the smaller diameter thereof facing a reaction chamber, and a quenching zone following the reaction chamber serving to quench cracked product.

Apparatus comprises in coaxial arrangement a conventional arc chamber, an axially symmetrical reaction chamber with the larger diameter thereof facing the arc chamber and with the smaller diameter thereof facing a post-reaction chamber following the reaction chamber, and a quenching zone following the post-reaction chamber and serving to quench cracked product.

CROSS REFERENCE TO RELATED APPLICATION

The present application is a division of application Ser. No. 476,422, filed Aug. 2, 1965, now U.S. Pat. 3,409,695.

The present invention provides a process and apparatus for cracking hydrocarbons with the aid of hydrogen heated in an electric arc, so as to obtain acetylene, ethylene, methane and hydrogen.

Various processes for cracking hydrocarbons with the aid of an electric arc have already been described. For example, in the processes disclosed in German Pats. Nos. 806,455 and 871,001, a liquid feed hydrocarbon is caused to travel through an electric arc while hydrogen is injected concurrently therewith, or a hydrogen-containing or inert atmosphere is maintained in the reaction chamber. But these processes incur the formation of considerable amounts of by-products which reduce the yield. Carbon black is more especially obtained in appreciated quantities.

In the process described in German Pat. No. 587,129, the arc is also allowed to burn in an atmosphere consisting essentially of hydrogen, but the inside walls of the reaction chamber are rinsed with liquid feed hydrocarbon.

As taught in German Pat. No. 1,064,945, the inside wall of the reaction chamber is rinsed with water or heavy oil which is continuously supplied, and calorific energy necessary to achieve the endothermal cracking reaction is produced by subjecting the feed hydrocarbon to partial combustion in the reaction chamber, or it is produced by supplying hot gases from the outside.

Further prior art processes have been disclosed in Pat. No. 160,519, Reichspatentamt, Zweigstelle Oesterreich, which describes an improved method of utilizing calorific energy in excess available in the reaction chamber for cracking purposes, and in Belgian Pat. No. 544,124 which describes the manner of circulating the feed hydrocarbon and gaseous heat carrier in the reaction chamber.

Still further processes have been disclosed in German Pats. Nos. 1,175,224 and 1,168,419. In the first of these two processes, a rotating, thin and continuously renewing film of liquid feed hydrocarbon is exposed to the simultaneous action of hydrogen heated in the electric arc and to the radiation emitted by the arc. In the second of these two processes, hydrogen heated in the arc zone is contacted in a reaction zone following that arc zone with feed hydrocarbon which is used in gas or vapor form, the feed hydrocarbon being supplied tangentially with respect to the reaction zone at the remote end thereof and being caused to flow in a helical line along the walls of the reaction zone countercurrently to hot hydrogen. At the other end of the reaction zone, the direction of motion of the reaction mixture is reversed and the reaction mixture is caused to flow along the center axis of an axially symmetrical reaction zone and with increasing flow speed into a post-reaction zone to be ultimately quenched. In this latter process, a first partial stream of hydrogen is supplied at the upper rim portion of the arc zone tangentially thereinto, and further partial streams of hydrogen are introduced into that zone along the electrodes so as uniformly to envelop the electrodes. The present invention also uses this method of introducing and heating the hydrogen.

The process of the present invention comprises injecting feed hydrocarbon in vapor form, near the inflow end of a reaction zone, co-currently to hot hydrogen travelling therethrough, causing reaction mixture to travel at a continuously increasing velocity through the reaction zone towards the discharge end thereof, thereafter introducing, near the inflow end of a post-reaction zone immediately following the reaction zone, a further quantity of feed hydrocarbon in vapor form into the hot reaction mixture travelling henceforth at a substantially uniform velocity of flow, said further feed hydrocarbon being introduced in a direction transverse to the direction of motion of the reaction mixture, and ultimately quenching in conventional manner the reaction mixture or cracked product leaving the reaction zone.

A modified mode of executing the present process comprises conveying the flowing hot reaction mixture from the first reaction zone into a second reaction zone immediately following the first zone, introducing, near the inflow end of that second reaction zone, a further quantity of feed hydrocarbon in vapor form into the reaction mixture co-currently thereto, continuously increasing the velocity of flow of the reaction mixture, and ultimately quenching in conventional manner the reaction mixture or cracked product leaving that second reaction zone. No post-reaction zone need be used when two or more series-connected reaction zones are employed.

The velocity of flow of the reaction mixture within the reaction zone is steadily increased by allowing guide forces to act upon the reaction mixture which reduce the cross-sectional area of the flowing material.

Two to seven, preferably two to five, kw. hr. are used per cubic meter (S.T.P.) hydrogen to heat the hydrogen supplied in partial streams to the electric arc.

The hot hydrogen is conveniently introduced into the first reaction zone with a velocity of flow of about 40–400 m./second, preferably 60 m./second.

The feed hydrocarbon in vapor form is introduced into the reaction zone at a velocity of flow of about 20–400 m./second. Hydrocarbons of low molecular weight, e.g. methane, are supplied at a velocity of flow of about 100 to 400 m./second and petroleum hydrocarbons having the mean composition $C_6H_{14}$ are supplied at a velocity of flow of about 50 to 150 m./second.

An apparatus suitable for use in carrying out the process of the present invention comprises in coaxial arrangement a conventional arc chamber, an axially symmetrical reaction chamber with the larger diameter thereof facing the arc chamber and with the smaller diameter thereof facing a post-reaction chamber following the reaction chamber, and a quenching zone following the post reaction chamber and serving to quench cracked product.

The constructional elements forming the arc chamber have been described in German Pat. No. 1,168,419, and essential parts thereof are used herein unchanged. The arc chamber comprises a cooled chamber of circular cylindrical design having an open bottom portion and a covered top portion with openings to receive and means to hold electrodes. Near its upper rim portion, the arc chamber has inlet openings for supplying hydrogen to be heated in the arc chamber, and the electrodes are passed through special sleeves which enable further partial streams of hydrogen to be introduced along the electrodes into the arc chamber.

The upper rim portions of reaction chamber and post-reaction chamber have annular slits of special design attached thereto, which serve to supply feed hydrocarbon in vapor form.

A sectional view of the apparatus taken along its meridian plan indicates that the directrix of the reaction chamber has an upper portion which is concave and a lower portion following a point of inflection which is convex with respect to the axis of rotation. In the extreme case, i.e. with radii of curvature infinitely large, the directrix of a truncated cone is ultimately obtained. The reaction chamber so-shaped enables the feed-hydrocarbon in vapor form, which is introduced near the upper rim portion of the reaction chamber through an annular slit in tangential relationship with respect to the generated surface of the reaction chamber, to be subjected while travelling through the reaction chamber to the action of guide forces acting in the direction of the axis of rotation, which steadily reduce the cross-sectional area of flowing material while increasing its velocity of flow until the reaction mixture ultimately leaves the reaction chamber. Every element of volume forming part of the reaction mixture travels substantially on a meridian of the reaction chamber.

In order to achieve an especially uniform degree of distribution of feed hydrocarbon in vapor form across the wall of the reaction chamber, it may be convenient to convey the feed hydrocarbon leaving the annular slit, e.g. by means of a guide vane, in a direction deviating from the meridian lines through an angle of 0 to 30°.

The outlet opening of the reaction chamber has a diameter smaller than that of the following post-reaction chamber which in turn has a diameter smaller than that of the following quenching chamber.

In a modified form of construction of the apparatus of the present invention, the first reaction chamber is series-connected to one or more further reaction chambers which in turn are connected to the following quenching chamber. All reaction chambers, except the reaction chamber located immediately before the quenching chamber, comprise no more than the directrix portion which is concave with respect to the axis of rotation.

The inlet opening of each reaction chamber is surrounded by an annular slit which is situated in a plane perpendicular with respect to the axis of rotation and through which feed hydrocarbon in vapor form is supplied. The annular slit is surrounded by a lip disposed near the reaction chamber and near the annular slit walls first contacted with flowing hydrogen or flowing reaction mixture, the lip pointing in the direction of flow to deflect the jet of feed hydrocarbon in vapor form. The lip forces hydrocarbon entering into the reaction chamber through the annular slit to run closely down the walls of the reaction chamber and thus prevents carbon from depositing thereon.

No post-reaction chamber is necessary when two or more reaction chambers are series-connected to one another. In other words, the last reaction chamber communicates directly with the quenching chamber.

The post-reaction chamber and quenching chamber both have an annular slit disposed near their inlet openings which lies in a plane perpendicular to the axis of rotation and through which a further quantity of feed hydrocarbon in vapor form is introduced into flowing hot reaction mixture or through which quenching agent is introduced into flowing hot cracked product radially with respect to the axis of rotation and in the plane of that annular slit.

An apparatus suitable for use in carrying out the process of the present invention is shown diagrammatically in the accompanying drawings, wherein.

Figure 1:
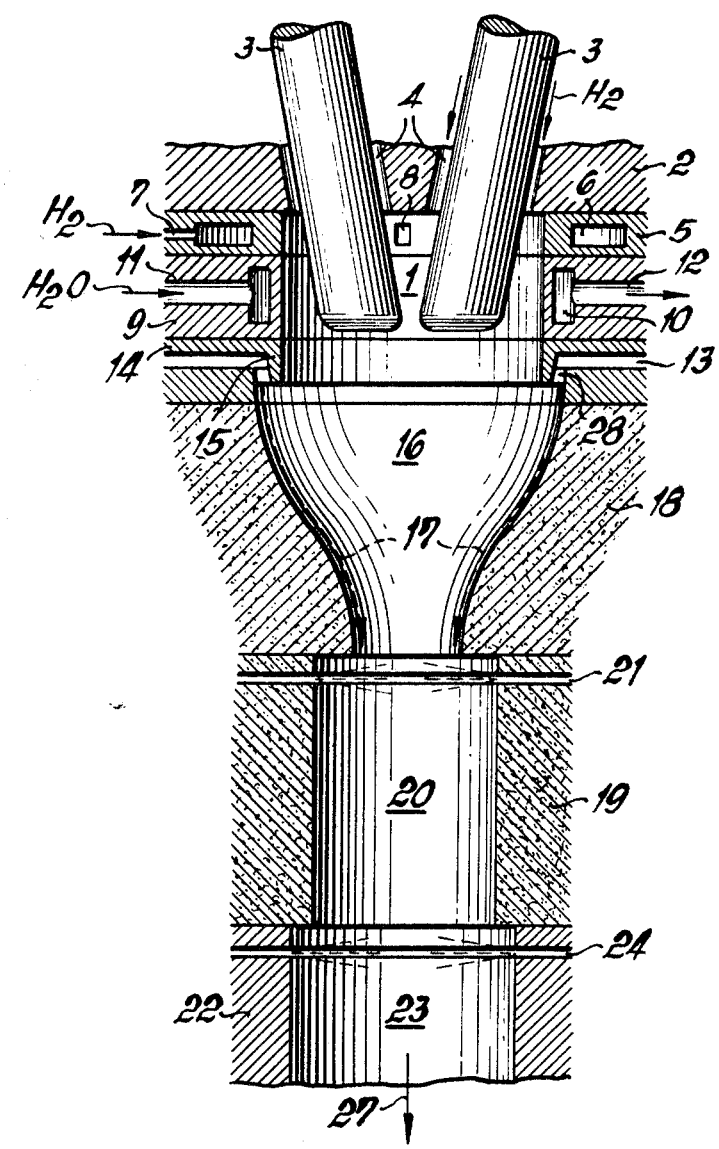
FIG. 1 represents a meridian sectional view of an apparatus comprising an arc chamber, reaction chamber, post-reaction chamber and quenching chamber.

In FIG. 1, the arc chamber 1 is substantially limited by the cylindrical bore of spacer 9, which e.g. may be made of copper, spacer 9 being provided with an annular channel 10 to introduced a coolant, e.g. water, and with a water feed line 11 and a water outlet pipe 12.

The top portion of arc chamber 1 is covered by cover 2 which has openings to receive and means to hold electrodes 3. Each electrode 3 is surrounded by an annular inflow channel 4 supplying hydrogen so as to flow around the electrodes into arc chamber 1.

A distributor ring 5 having an annular channel 6 and serving to introduce further quantities of hydrogen is disposed between cover 2 and spacer 9. Annular channel 6 communicates through feed line 7 with a hydrogen source and communicates with arc chamber 1 through a plurality of outflow openings 8 distributed on a circle line and projecting tangentially into arc chamber 1.

Arc chamber 1 communicates in the direction of flow of hot hydrogen partial streams with annular slits 13 through which evaporated feed hydrocarbon is introduced into reaction chamber 16. The wall 14 of annular slit 13 first contacted with flowing hot hydrogen is surrounded near the side facing the reaction chamber 16 with a lip 15 which deflects the stream of evaporated feed hydrocarbon 17 issuing through annular slit 13 so as to form a thin layer of hydrogen on the inside wall of reaction chamber 16. The shape conferred upon that inside wall ensures that this thin layer, except those portions thereof which undergo chemical transformation, is substantially preserved until the reaction mixture ultimately leaves the reaction chamber to flow into the following post-reaction chamber 20.

Inclined guide vanes 28 may be mounted in annular slit 13 when it is desired to introduce feed hydrocarbon into reaction chamber 16 of FIG. 1 in a direction of flow other than parallel to the meridian lines.

Reaction chamber 16 is located in reactor structure 18, which e.g. may consist of graphite and is cooled from the outside.

The same applies to post-reaction chamber 20 located in reactor structure 19. The post-reaction chamber 20 has a circular cylindrical shape and its inflow side is surrounded by an annular slit 21 through which a further quantity of feed hydrocarbon in vapor form is introduced substantially in radial relationship with respect to flowing hot reaction mixture travelling in the direction of the axis of rotation. The feed hydrocarbon in vapor form can also be introduced in tangential relationship. In this case, the annular slit 21 can be replaced with means similar to structures 5, 6, 7 and 8 which are used for the tangential supply of hydrogen.

Post-reaction chamber 20 communicates in the direction of flow with quenching chamber 23 of circular cylindrical design located in quenching structure 22, the quenching chamber 23 being surrounded near its opening portion by an annular slit 24 through which a quenching agent is introduced radially with respect to hot cracked product flowing into the quenching chamber.

Quenched cracked product leaves the quenching chamber in the direction indicated by arrow 27 to be worked up in conventional manner.

Figure 2:
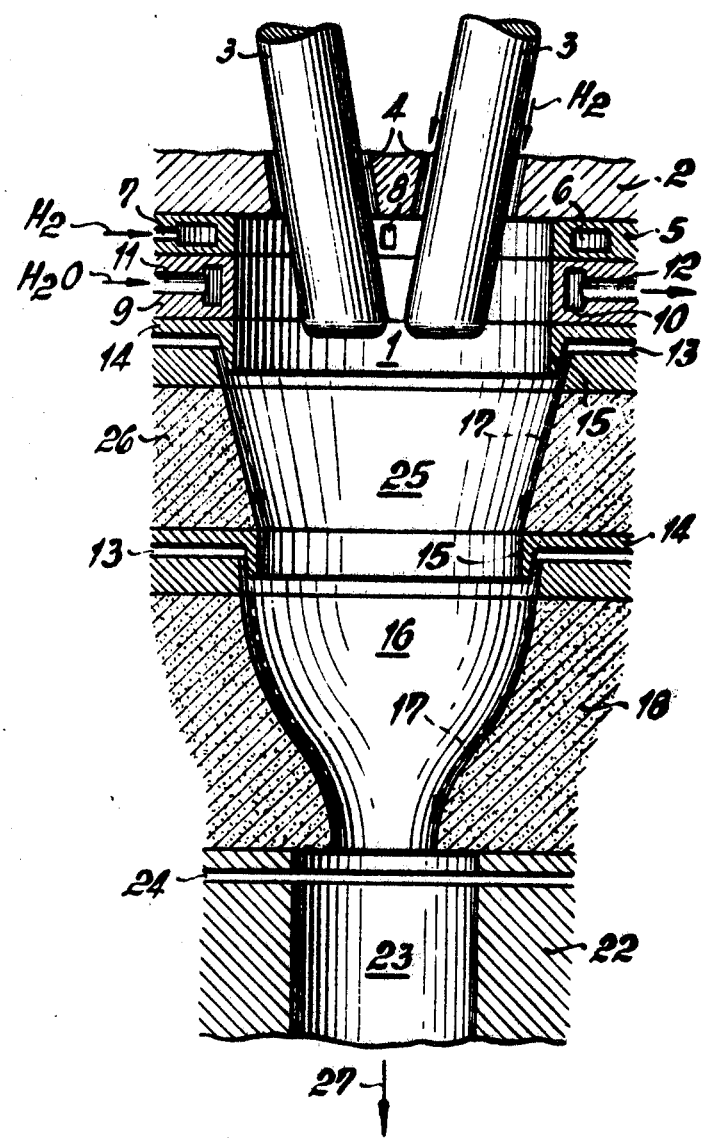
FIG. 2 represents a meridian sectional view of an apparatus comprising a first and a second reaction chamber and a quenching chamber connected thereto.

The apparatus shown in FIG. 2 differs from that shown in FIG. 1 in that the post-reaction chamber is replaced with a second reaction chamber 25 which is located in reactor structure 26 and provided with an annular slit 14 for the tangential supply of evaporated feed hydrocarbon. Reaction chamber 25 comprises no more than that portion of the meridan section which is concave with respect to the axis of rotation.

In the embodiment shown in FIG. 2, feed hydrocarbon such as introduced into reaction chamber 25 primarily serves to produce a protective layer on the walls thereof, while intimate mixing of feed hydrocarbon in vapor form with hot hydrogen takes place when the mixture enters into the second reaction chamber 16. In other words, slightly varying functions are assigned to reaction chambers 25 and 16. In this embodiment of the present invention it is advantageous to allow feed hydrocarbon to enter into reaction chamber 25 at a velocity of flow approximately the same as that used for supplying hot hydrogen.

For the sake of greater clearness, FIGS. 1 and 2, respectively, have been drawn to show two instead of three electrodes such as employed in a conventional three-phase system. The process of the present invention is also applicable when other current supply sources are used which call for an apparatus designed for operation with a different number of electrodes.

Example 1350 cubic meters (S.T.P.) hydrogen were heated in an electric heavy current arc burning in a water-cooled arc chamber 1 (FIG. 1) between three graphite electrodes and transforming an electric power of 5280 kw. The hydrogen was supplied in several partial streams while introducing a hydrogen portion along electrodes 3 through inflow channels 4 and introducing the hydrogen balance portion through hydrogen feed line 7, annular channel 6 and distributor ring 5 and ultimately through outlet openings 8 into arc chamber 1.

The heated and partially dissociated hydrogen entered into reaction chamber 16 at a mean velocity of flow of about 60 m./second. 2000 kg. gasoline in vapor form boiling at 40–130° C. were then introduced through cooled annular slit 13 into reaction chamber 16 at a velocity of flow of about 80 m./second. Lip 15 surrounding the annular slit 13 and the shape conferred upon reaction chamber 16 forced the gasoline in vapor form 17 while travelling through reaction chamber 16 to run closely down the walls thereof and thus uniformly to rinse reaction chamber 16 in a manner similar to the hydrogen.

The reaction mixture travelled from reaction chamber 16 into post-reaction chamber 20 into which a further 200 kg. gasoline in vapor form were introduced near the inflow end of chamber 20 through annular slit 21.

Cracked product was quenched in quenching chamber 23 provided near its inflow end with an annular slit 24 spraying 80 cubic meters/hr. of a paraffinic oil boiling at 180–350° C. into the quenching chamber.

3590 cubic meters (S.T.P.) crack gas containing 15.5% by volume acetylene and 7.7% by volume ethylene were obtained per hour. This corresponded to a yield of 651 kg. acetylene and 345 kg. ethylene per hour. Methane, hydrogen and rather small amounts of higher acetylenes, which could be recycled into the process, were also obtained.

No deposition of carbon black and coke in the reaction chamber or on the electrodes was observed even after prolonged operation.

What is claimed is:
1. An apparatus for carrying out a process for the thermal cracking of substances, especially hydrocarbons, capable of being split by thermal means, in the presence of a gas heated in an electric arc and serving as a heat transfer agent, the apparatus being formed in coaxial arrangement of an arc chamber of substantially cylindrical design provided at the electrode-side with a top cover having ducts for the supply of the gas into the arc chamber along the electrodes, a ring near the electrode-side end for the supply of further gas in a direction tangential with respect to the arc chamber, a cooling channel accessible from the outside, a reaction zone tapered in the direction of flow of the gas and formed of several reaction chambers, and a quenching chamber, apparatus wherein the reaction zone is formed of a reaction chamber and a post reaction chamber, two concentric rings between the arc chamber and the reaction chamber forming an annular slit therebetween, the upper ring having a surrounding guide lip above the lower ring that extends in the direction of flow and overlaps the inside periphery of the lower ring, and another annular slit disposed transversely to the direction of flow and formed near the electrode-side end of the post reaction chamber.

2. An apparatus as in claim 1 wherein the reaction chamber is substantially in the shape of an inverted bell tapered in the direction of the quenching chamber, and the post reaction chamber is substantially of cylindrical design.

3. An apparatus as in claim 2 wherein the outlet opening of the reaction chamber has a diameter smaller than the inlet diameter of the post reaction chamber which in turn has a diameter smaller than the inlet diameter of the quenching chamber.

4. An apparatus as in claim 1 wherein the reaction chamber and the quenching chamber each have an annular slit disposed near their inlet openings for introducing in a radial direction the substance entering the chambers through the slits, each slit lying in a plane perpendicular to the direction of flow through the chambers.

5. An apparatus for carrying out a process for the thermal cracking of substances, especially hydrocarbons, capable of being split by thermal means, in the presence of a gas heated in an electric arc and serving as a heat transfer agent, the appaartus being formed in coaxial arrangement of an arc chamber of substantially cylindrical design provided at the electrode-side with a top cover having ducts for the supply of the gas into the arc chamber along the electrodes, a ring near the electrode-side end for the supply of further gas in a direction tangential with respect to the arc chamber, a cooling channel accessible from the outside, a reaction zone tapered in the direction of flow of the gas and formed of several reaction chambers, and a quenching chamber, apparatus wherein the reaction zone is formed of a preliminary reaction chamber and a reaction chamber, and at least one annular slit disposed near the inlet open portion of one of the preliminary reaction and reaction chambers for introducing the substance to be treated into the chambers.

6. An apparatus as in claim 5 wherein the reaction chamber is substantially in the shape of an inverted bell tapered in the direction of the quenching chamber, and the preliminary reaction chamber is substantially in the shape of an inverted bell-base.

7. An apparatus as in claim 6 wherein the inlet opening of each reaction chamber is surrounded by an annular slit situated in a plane perpendicular with respect to the axis of rotation of the chamber, each slit having a lip extending in the direction of the reaction chamber to deflect the substance entering the chambers.

References Cited

UNITED STATES PATENTS

| 2,923,811 | 2/1960 | Feldmeyer et al. | 219—121 |
| 3,079,325 | 2/1963 | Butenuth et al. | 204—328 |
| 3,114,691 | 12/1963 | Case | 204—171 |
| 3,409,695 | 11/1968 | Sennewald et al. | 260—679 |

JAMES H. TAYMAN, JR., Primary Examiner

U.S. Cl. X.R.

23—277, 209.3, 259.5; 204—324, 328, 171; 313—231; 13—9; 219—121; 260—679